(12) United States Patent
Ramanathan et al.

(10) Patent No.: US 11,479,412 B2
(45) Date of Patent: Oct. 25, 2022

(54) ORDER SORTATION SYSTEMS

(71) Applicant: Target Brands, Inc., Minneapolis, MN (US)

(72) Inventors: Jayabarathi Ramanathan, Minneapolis, MN (US); Matthew Dunaj, Minneapolis, MN (US); Mitchell Sanssouci, Minneapolis, MN (US); Tina Ottinger, Minneapolis, MN (US); Stephanie Westrich, Minneapolis, MN (US); Josh McKinley, Minneapolis, MN (US); Ethan Coyne, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 396 days.

(21) Appl. No.: 16/883,689

(22) Filed: May 26, 2020

(65) Prior Publication Data

US 2021/0061567 A1 Mar. 4, 2021

Related U.S. Application Data

(60) Provisional application No. 62/892,172, filed on Aug. 27, 2019.

(51) Int. Cl.
*B65G 1/137* (2006.01)
*B65G 1/06* (2006.01)
*G06Q 30/06* (2012.01)

(52) U.S. Cl.
CPC .......... *B65G 1/1376* (2013.01); *B65G 1/065* (2013.01); *G06Q 30/0635* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,540,532 A * | 7/1996 | Carder | ................. | B65G 1/0407 414/284 |
| 5,879,277 A * | 3/1999 | Dettman | .............. | B25J 15/0491 901/41 |
| 7,894,932 B2 * | 2/2011 | Mountz | ............... | G06Q 10/087 700/214 |
| 8,234,006 B1 * | 7/2012 | Sachar | ................. | G06Q 10/087 700/214 |
| 8,571,701 B2 * | 10/2013 | Lunak | .................. | G06Q 10/087 700/216 |
| 8,798,784 B1 * | 8/2014 | Clark | ..................... | G06Q 10/08 700/214 |
| 9,626,714 B2 * | 4/2017 | Boer | .................. | G06Q 30/0635 |
| 10,127,514 B2 * | 11/2018 | Napoli | ................ | G06Q 10/083 |
| 2016/0236869 A1 * | 8/2016 | Kimura | ................ | B65G 1/1378 |

(Continued)

*Primary Examiner* — Kyle O Logan
(74) *Attorney, Agent, or Firm* — Fish & Richardson P.C.

(57) ABSTRACT

Systems and methods can enhance efficiencies of order fulfillment processes. For example, this document describes systems and methods for optimizing the efficiency of order sortation processes to expedite order processing in a cost-effective manner. The systems and methods facilitate high utilization of labor due to reductions in wasted movements and even loading of workers of a team of workers. Additionally, the systems and methods promote efficiency enhancements of order sortation equipment by reducing the potential for downtime due to material flow interferences.

20 Claims, 5 Drawing Sheets

(56) References Cited

U.S. PATENT DOCUMENTS

| | | | | |
|---|---|---|---|---|
| 2020/0319219 | A1* | 10/2020 | Vansickler | G01N 35/04 |
| 2021/0165424 | A1* | 6/2021 | Bijelovic | G05D 1/0297 |
| 2021/0311082 | A1* | 10/2021 | Tesluk | G01N 35/00732 |
| 2021/0323767 | A1* | 10/2021 | Liu | B66F 9/0755 |

\* cited by examiner

ORDER SORTATION SYSTEMS

CROSS-REFERENCE TO RELATED APPLICATIONS

This application claims the benefit of U.S. Provisional Application Ser. No. 62/892,172, filed Aug. 27, 2019. The disclosure of the prior application is considered part of (and is incorporated by reference in) the disclosure of this application.

TECHNICAL FIELD

This document relates to systems and methods for enhancing efficiencies of order fulfillment processes. For example, this document relates to systems and methods for optimizing the efficiency of order sortation processes to expedite order processing in a cost-effective manner.

BACKGROUND

Customers expect their orders to be fulfilled properly and promptly on a consistent basis. Second-day deliveries are now essentially an ordinary expectation, and same-day or next-day deliveries are becoming more standard. Highly efficient warehousing, order processing, and shipping processes are required to meet these increasingly higher levels of customer expectations.

The order fulfillment process refers to all the steps companies take from when they receive a customer order (which can include an order that is wholly or partly internal to the company, such as a store replenishment order) until the items are landed in customers' hands. Such steps can include, for example: the order is sent to the warehouse; a worker goes into the warehouse, finds the items in the order, and picks the items off the shelf; the order is packed for shipping; the order is shipped. Order processing involves picking (e.g., retrieval of items from where they are stored), order sortation, and packaging (e.g., getting the order ready to ship).

The use of order processing optimization is one way to increase the efficiency of an order fulfillment process. The goal of order processing optimization is to cut out inefficiencies of the order fulfillment process.

SUMMARY

This document describes systems and methods for enhancing efficiencies of order fulfillment processes. For example, this document describes systems and methods for optimizing the efficiency of order sortation processes to expedite order processing in a cost-effective manner. The systems and methods described herein facilitate high utilization of labor due to reductions in wasted movements. Additionally, the systems and methods described herein promote efficiency enhancements of order sortation equipment by reducing the potential for downtime due to material flow interferences.

In one aspect, this disclosure is directed to method of automatic order sortation. In some embodiments, the method includes (1) receiving, by an automated order sortation system, a plurality of items individually inducted into the automated order sortation system and (2) transporting, by item transport vehicles, the plurality of items to the plurality of receptacle stations so as to utilize the plurality of receptacle stations in accordance with a pattern comprising alternating between: (i) the first end portion of the first matrix and (ii) the second end portion of the second matrix, while a lowest row of each of the first and second matrices of receptacle stations is unutilized. The automated order sortation system can include a plurality of receptacle stations arranged in a first matrix and a second matrix. The first and second matrices of receptacle stations are arranged parallel to each other and are separated by an item transportation system. The first matrix of receptacle stations includes: (i) a first end portion, (ii) a second end portion, and a (iii) middle located between the first and second end portions. The second matrix of receptacle stations includes: (i) a first end portion, (ii) a second end portion, and a (iii) middle located between the first and second end portions. Each of: (a) the first end portions, (b) the middles, and (c) the second end portions of the first and second matrices of receptacle stations are aligned with each other on opposite sides of the item transportation system. The item transportation system includes multiple item transport vehicles configured to travel along the automated order sortation system between the first and second matrices of receptacle stations. Each of the item transport vehicles is configured to transport singular items of the plurality of items and to transfer the singular items to individual receptacle stations of the plurality of receptacle stations.

Such a method may optionally include one or more of the following features. The pattern may also include utilizing the first end portion of the first matrix and the second end portion of the second matrix by starting near the middles and progressing outward. The method may also include continuing the alternating between: (i) the first end portion of the first matrix and (ii) the second end portion of the second matrix until both of the first end portion of the first matrix and the second end portion of the second matrix are fully utilized. The pattern may also include, after both of the first end portion of the first matrix and the second end portion of the second matrix are fully utilized, alternating between: (iii) the second end portion of the first matrix and (iv) the first end portion of the second matrix, while the lowest row of each of the first and second matrices of receptacle stations is unutilized. The pattern may also include utilizing the second end portion of the first matrix and the first end portion of the second matrix by starting near the middles and progressing outward. The pattern may also include, after both of the first and second end portions of the first matrix and both of the first and second end portions of the second matrix are fully utilized, beginning to utilize the lowest row of each of the first and second matrices of receptacle stations. The utilizing the lowest row of each of the first and second matrices of receptacle stations may start at an end of the second end portion of the first matrix and at an end of the second end portion of the second matrix, and progress toward an end of the first end portion of the first matrix and an end of the first end portion of the second matrix, respectively. The plurality of items individually inducted into the automated order sortation system induction line may be inducted on an induction conveyor located at an end of the first end portion of the first matrix. The method may also include determining, by the automated order sortation system, an identity of each item of the plurality of items individually inducted into the automated order sortation system.

In another aspect, this disclosure is directed to an automatic order sortation system. The automatic order sortation system includes: (1) a plurality of receptacle stations arranged in a first matrix and a second matrix, wherein the first and second matrices of receptacle stations are arranged parallel to each other and are separated by an item transportation system; (2) the item transportation system comprising multiple item transport vehicles configured to travel along the automated order sortation system between the first and second matrices of receptacle stations, each of the item transport vehicles configured to transport singular items of the plurality of items and to transfer the singular items to individual receptacle stations of the plurality of receptacle stations; and (3) a control system configured to control the item transportation system to utilize the plurality of receptacle stations in accordance with a pattern comprising alternating between: (i) the first end portion of the first matrix and (ii) the second end portion of the second matrix, while a lowest row of each of the first and second matrices of receptacle stations is unutilized. The first matrix of receptacle stations includes: (i) a first end portion, (ii) a second end portion, and a (iii) middle located between the first and second end portions. The second matrix of receptacle stations includes: (i) a first end portion, (ii) a second end portion, and a (iii) middle located between the first and second end portions. Each of: (a) the first end portions, (b) the middles, and (c) the second end portions of the first and second matrices of receptacle stations are aligned with each other on opposite sides of the item transportation system.

Such a system may optionally include one or more of the following features. The system may also include an induction conveyor located at an end of the first end portion of the first matrix. The system may also include a bar code scanner configured to determine an identity of each item of the plurality of items individually inducted into the automated order sortation system via the induction conveyor. The pattern may also include utilizing the first end portion of the first matrix and the second end portion of the second matrix by starting near the middles and progressing outward. The pattern may also include, after both of the first end portion of the first matrix and the second end portion of the second matrix are fully utilized, alternating between: (iii) the second end portion of the first matrix and (iv) the first end portion of the second matrix, while the lowest row of each of the first and second matrices of receptacle stations is unutilized. The pattern may also include utilizing the second end portion of the first matrix and the first end portion of the second matrix by starting near the middles and progressing outward. The pattern may also include, after both of the first and second end portions of the first matrix and both of the first and second end portions of the second matrix are fully utilized, beginning to utilize the lowest row of each of the first and second matrices of receptacle stations. The utilizing the lowest row of each of the first and second matrices of receptacle stations may start at an end of the second end portion of the first matrix and at an end of the second end portion of the second matrix, and progress toward an end of the first end portion of the first matrix and an end of the first end portion of the second matrix, respectively. The system may also include a plurality of bins. Each bin of the plurality of bins may be positioned in a receptacle station of the plurality of receptacle stations. The pattern may also include utilizing the second end portion of the first matrix and the first end portion of the second matrix by starting near the middles and progressing outward, and starting at a top of each column and progressing downward until the column is utilized. In some embodiments, the item transport vehicles are configured to travel along between the lowest row of the first and second matrices of receptacle stations after transferring the singular items to the individual receptacle stations of the plurality of receptacle stations.

The systems and processes described here may be used to provide one or more of the following optional benefits. First, some embodiments provide an order fulfillment process that is more efficient, responsive, and agile so orders can be shipped to internal and external customers in a shorter timeframe than some current processes. Such a result can be accomplished, for example, through optimizing material flow by reducing delays and interferences. Second, some embodiments allow enhanced utilization of human workers by reducing unproductive travel times during order sortation tasks, and by evenly loading each worker of a team of workers. Third, some embodiments of the systems and methods described herein are readily scalable to respond efficiently to increasing or decreasing order processing demands. Fourth, in some embodiments the labor costs associated with the order fulfillment processes can be reduced using the systems and processes described herein. Sixth, in some embodiments floor space requirements for order processing can be reduced using the systems and processes described herein. Seventh, the systems and methods described herein can result in efficiency enhancements of order sortation equipment by reducing the potential for downtime due to material flow interferences.

Other features, aspects and potential advantages will be apparent from the accompanying description and figures.

DESCRIPTION OF DRAWINGS

Like reference symbols in the various drawings indicate like elements

DETAILED DESCRIPTION

This document describes systems and methods for enhancing efficiencies of order fulfillment processes. For example, this document describes systems and methods for optimizing the efficiency of order sortation processes to expedite order processing in a cost-effective manner. The systems and methods described herein facilitate high utilization of labor due to reductions in wasted movements and even loading of workers of a team of workers. Additionally, the systems and methods described herein promote efficiency enhancements of order sortation equipment by reducing the potential for downtime due to material flow interferences as described further below.

Figure 1:
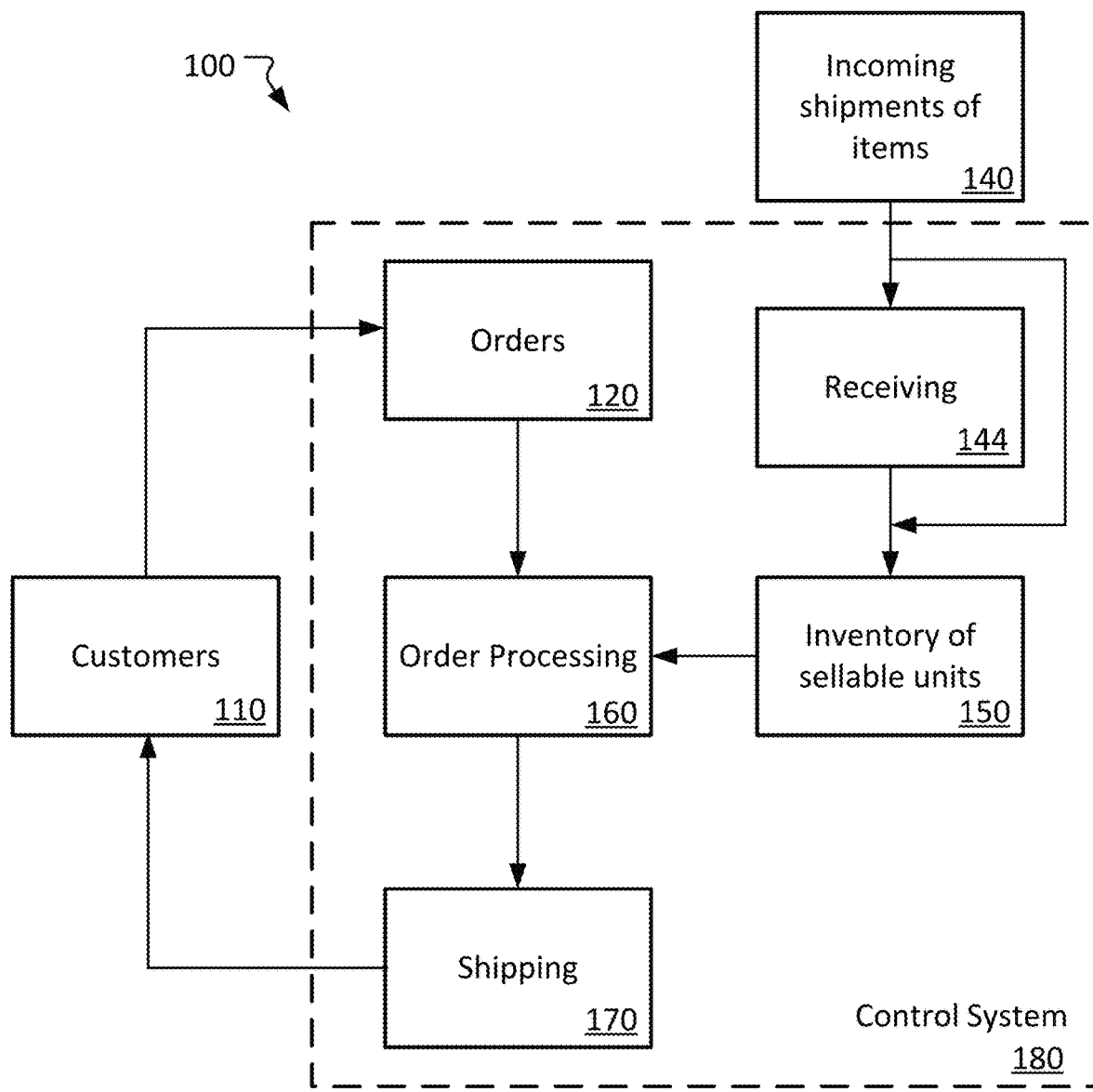
FIG. 1 is a highly simplified schematic diagram of a basic order fulfillment process.

FIG. 1 is a schematic diagram illustrating an example order fulfillment process 100. The order fulfillment process 100 may take place at a variety of different types of facilities such as, but not limited to, flow centers, distribution centers, warehouses, inventory storing locations, order fulfillment centers, receive centers, stores, cross-docking facilities, material handling facilities, and the like, and combinations thereof. In this disclosure, the term "flow center" may be used to refer to any and all such different types of facilities, and combinations thereof. In some examples, the order fulfillment process 100 takes place at a single facility. Alternatively, in some examples execution of the order fulfillment process 100 is distributed across two or more facilities. A flow center as described herein can be a portion of a multi-echelon supply chain.

Order fulfillment process 100 includes the daily replenishment and movement of inventory generated from real-time demand singles for in-store retail sales and direct-to-guest on-line sales fulfilled from a multi-echelon inventory-holding model at the correct unit of measure, using fast and easy material handling equipment that will create operational efficiency at every process step in the supply chain.

The flow of sellable items within the overall order fulfillment process 100 is driven by demand for those sellable items from customers 110. In this disclosure, the term "customers" will be used to broadly refer to a variety of different entities such as, but not limited to, individual consumers, retail stores (e.g., for stock replenishment), business partners, other flow centers, and the like.

Tangible orders 120 result from the demand for sellable items from the customers 110. An individual order 120 may be for one unit of a single sellable item, for multiple units of a single sellable item, for two or more different types of sellable items, for a case quantity, for a pallet load, and the like, and any and all possible permutations thereof. Whatever the order 120 includes, the goal of the order fulfillment process 100 is to ship (preferably in a single shipment) all of the sellable items included in the orders 120 in a timely and accurate manner. However, the scope of the order fulfillment process 100 also includes partial shipments that do not include all of the items included in an order 120.

The orders 120 are entered into an control system 180 (represented in FIG. 1 by the dashed-line boundary). In some examples, the control system 180 may be part of and/or may comprise a business management system such as, but not limited to, an enterprise resource planning (ERP) system, a materials management system, an inventory management system, a warehouse management system, one or more automation control systems, and the like, and combinations thereof. Accordingly, the control system 180 (or simply "control system 180") can, in some cases, broadly encompass multiple systems that can be situated locally, remotely, or situated both locally and remotely. The control system 180 can include hardware, software, user-interfaces, and so on. For example, the control system 180 may include one or more computer systems, data storage devices, wired and/or wireless networks, control system software (e.g., programs, modules, drivers, etc.), user interfaces, scanners, communication modules, interfaces for control communications with robots, and the like. Such scanners may include hand-held, mobile, and/or fixed readers that can scan, receive, or otherwise detect marks or tags (e.g., bar codes, radio frequency identification (RFID) tags, etc.) on individual sellable items or collections of sellable items (e.g., cases and totes) and communicate with a control station or stations of the control system 180. The scanners may also be able to scan, receive, or otherwise detect the marks or tags (e.g., bar codes, RFID tags, etc.) attached to or integrated with conveyance receptacles such as inventory totes and boxes.

Still referring to FIG. 1, incoming shipments of items 140 arrive at the flow center. In some cases, the incoming shipments of items 140 are processed by receiving 144 (e.g., the performance of inspections, quantity confirmations/reconciliations, inventory/order control system transactions, etc.). Afterwards, the items enter into inventory 150 of the flow center as sellable units. In some cases, some incoming items go directly from receiving 144 into inventory 150 (e.g., if the incoming items were transferred in from an affiliated facility at which the items were already in the inventory system). The types and quantities of the incoming items 140 may be controlled to keep a desired stock level of the sellable units in the inventory 150 of the flow center. In some cases, the types and quantities of the incoming items 140 may be the result of a proactive inventory transfer (e.g., "pushing" inventory), a reactive inventory transfer (e.g., "pulling" inventory), and/or other such inventory management techniques.

The sellable units in inventory 150 can be located in various types of storage accommodations such as racks, shelves, containers, vessels, carts, bins, totes, pallet lanes, and the like. Such storage accommodations can be individually identified and tracked by the control system 180. That is, the control system 180 can be used to keep track of the quantities in stock of the various sellable items in the inventory 150 and of the inventory location(s) of the various sellable items in the inventory 150. The sellable items in the inventory 150 can be stored in various receptacles such as, but not limited to, boxes, totes, pallets, baskets, bins, bags, and the like.

Next, in the step of order processing 160, the sellable item(s) included in the customer order 120 are compiled in preparation for shipment to the respective customer 110. This step includes order sortation processes as described below in the context of FIGS. 2-4.

To fulfill the customer orders 120, the one or more items specified in each order may be retrieved, or picked, from inventory 150. As described further below in reference to FIG. 2, the sellable items pertaining to the individual customer orders 120 may be delivered or conveyed to one or more areas in the flow center for sorting (order sortation) and compiling into one or more outbound shipping containers for the fulfillment of the respective customer orders 120. Outbound shipping containers containing the ordered sellable items are then transported to customers 110 at the step of shipping 170.

FIG. 1 and the foregoing description of the order fulfillment process 100 has provided a high-level overview of the operations of a flow center. Next, in reference to FIGS. 2-4, a more detailed description focused particularly on the operations of an order sortation system (which is part of order processing 160) will be provided.

Figure 2:
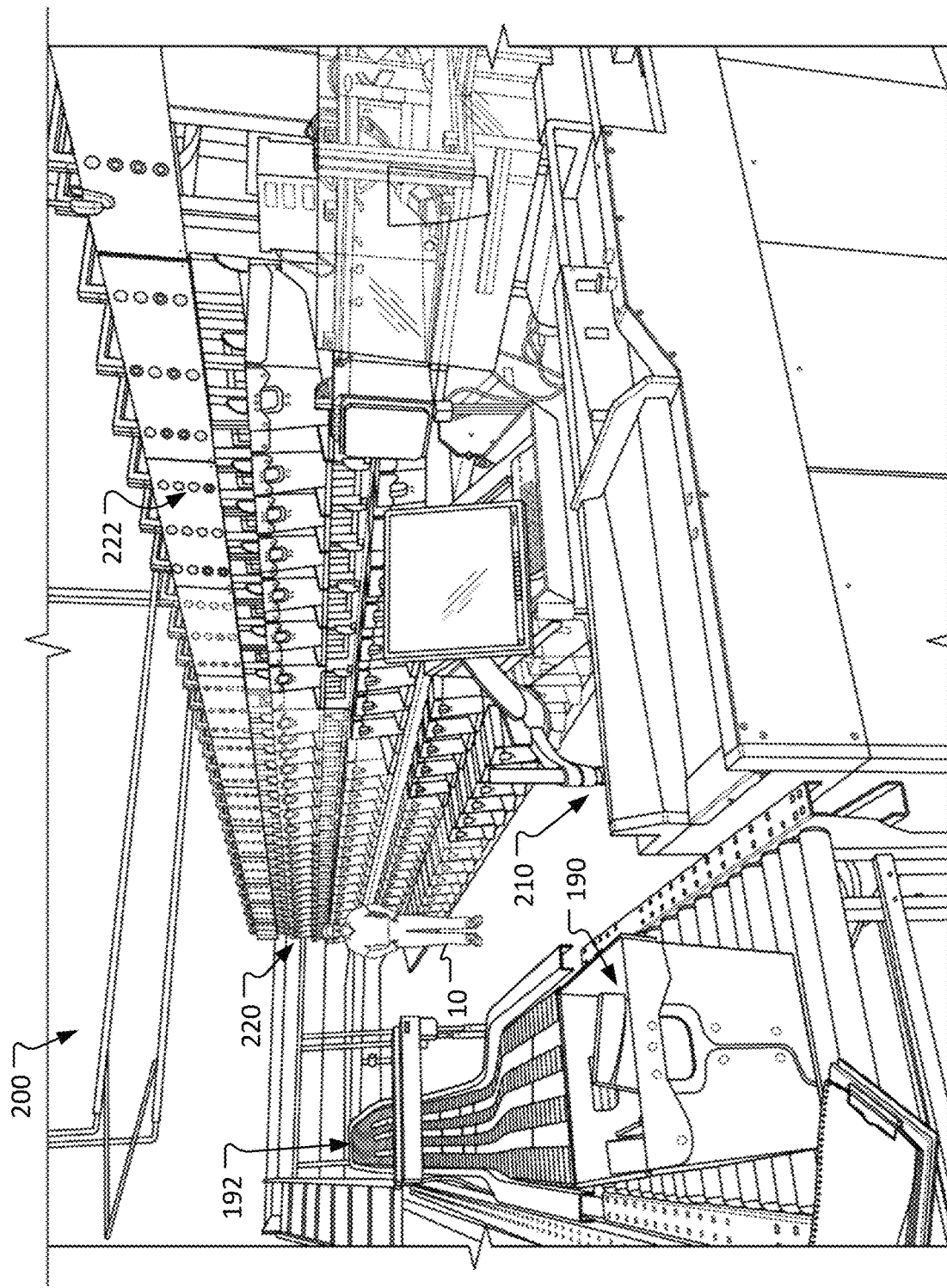
FIG. 2 is a depiction of an example order sortation system.

FIG. 2 illustrates an example automatic order sortation system 200. The purpose of the order sortation system 200 is to efficiently sort a large quantity of a variety of different types of items into the proper combinations of line items to fulfill multiple individual orders.

Unsorted items 190 can be transported from an inventory storage location to the order sortation system 200 via a conveyor 192 and/or using various other types of material handling systems (e.g., mobile robots, AGVs, etc.). The unsorted items 190 can be inducted into the order sortation system 200 by a worker (or robotically) via an induction system 210.

The induction system 210 can determine the identity of each of the unsorted items 190 individually (e.g., using a bar code scanner, RFID reader, visually, etc.). From there, as described further below, the order sortation system 200 can perform the task of automatically sorting the inducted items into the proper combinations of items to fulfill the individual orders being processed, resulting in completed individual orders contained in respective individual receptacles in a matrix of receptacle stations 220.

For example, a first order being processed by the order sortation system 200 may be for a quantity of two of item A and one of item B. A second order being processed by the order sortation system 200 may be for a quantity of four of item B and two of item C. A third order being processed by the order sortation system 200 may be for a quantity of two of item A, one of item B, and one of item C. In total then, the three orders require four of item A, six of item B, and three of item C. Accordingly, in this example the unsorted items 190 would include, at least, four of item A, six of item B, and three of item C. After the induction of the unsorted items 190 into the order sortation system 200 on an individual item-by-item basis via the induction system 210, the order sortation system 200 will singularly automatically transport all of the items for the first order to a first receptacle in the matrix of receptacle stations 220, singularly automatically transport all of the items for the second order to a second receptacle in the matrix of receptacle stations 220, and singularly automatically transport all of the items for the third order to a third receptacle in the matrix of receptacle stations 220. Accordingly, when the order sortation system 100 is finished sorting the three orders, the first receptacle will contain two of item A and one of item B (as per the first order), the second receptacle will contain four of item B and two of item C (as per the second order), and the third receptacle will contain two of item A, one of item B, and one of item C (as per the third order).

When the sortation of an individual order has been completed (such that a receptacle contains all of the items for the individual order) the order sortation system 200 will notify a worker 10 attending to the matrix of receptacle stations 220 so that the worker 10 can move the ordered items from the receptacle to a next operation (e.g., to a packaging operation in preparation for shipping the order). In some cases, the order sortation system 200 will utilize signal lights 222 to notify the worker 10 when a receptacle contains all of the items for the individual order. In response, in some cases the worker 10 will simply remove the receptacle containing the items from the matrix of receptacle stations 220 and then transfer the items from the receptacle to a box for shipment. The order 10 can then replace the receptacle back into an open receptacle station of the matrix of receptacle stations 220.

As shown in FIG. 2, the matrix of receptacle stations 220 can be a long multi-level matrix, and can contain a high number of receptacles. Accordingly, when the order sortation system 200 is being utilized at a high level, the worker 10 will tend to be very, very busy handling the receptacles. Moreover, the substantial length of the matrix of receptacle stations 220 can require the worker 10 to walk long distances (e.g., from end to end of the matrix of receptacle stations 220) while tending to the order sortation system 200. The time the worker 10 spends walking is generally unproductive time. Accordingly, as described further below, this disclosure describes a method of operating the order sortation system 200 that reduces the time the worker 10 spends walking while attending to the order sortation system 200.

Figure 3:
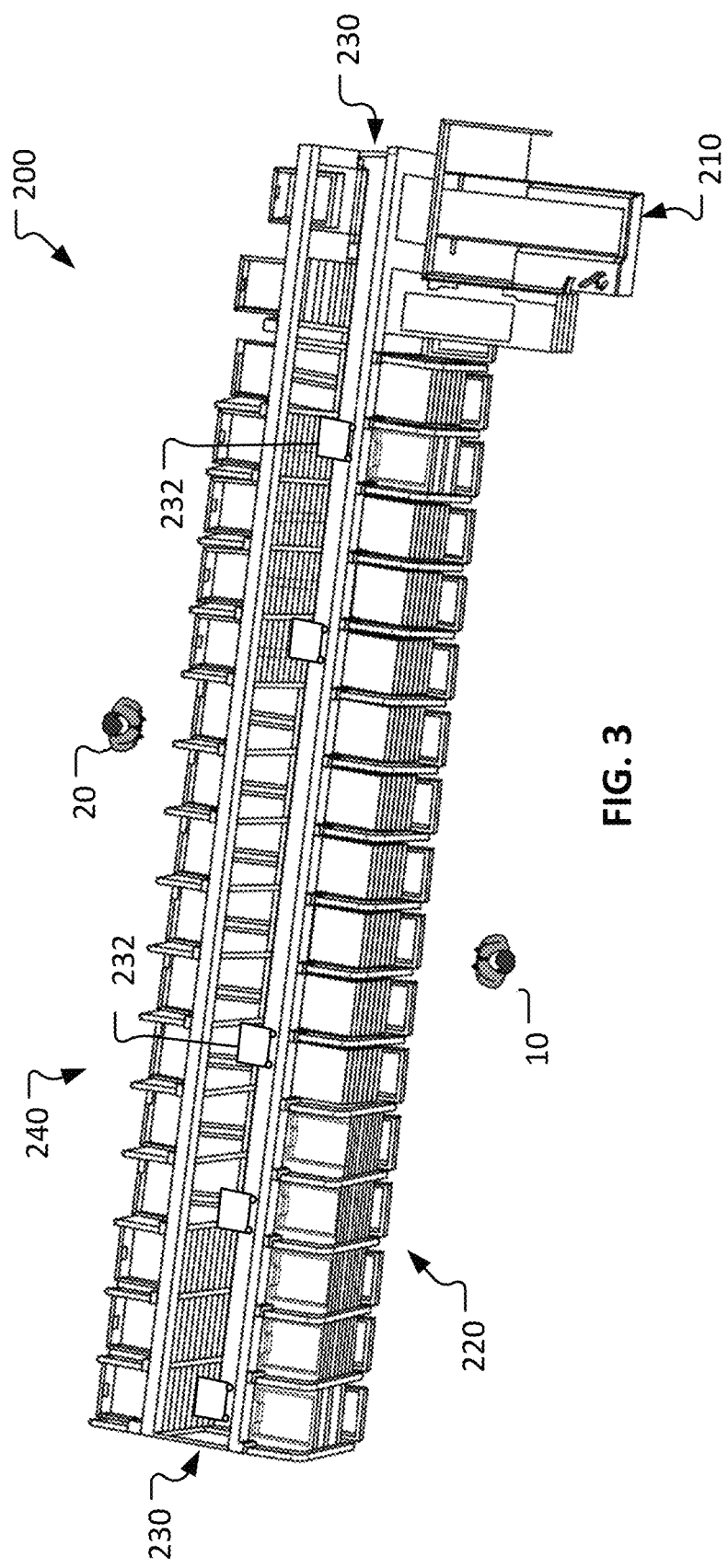
FIG. 3 is another view of the order sortation system of FIG. 2.

FIG. 3 shows a bird's eye perspective view of the example order sortation system 200. From this view it is apparent that, in addition to the induction system 210 and the matrix of receptacle stations 220 described above, the example order sortation system 200 includes an item transportation system 230 and a second matrix of receptacle stations 240. In other words, the order sortation system 200 includes a first matrix of receptacle stations 220 and a second matrix of receptacle stations 240.

The first matrix of receptacle stations 220 and the second matrix of receptacle stations 240 are arranged parallel to each other. The first matrix of receptacle stations 220 and the second matrix of receptacle stations 240 are separated by the item transportation system 230.

The item transportation system 230 includes a plurality of multi-directional item transport vehicles 232. Each of the item transport vehicles 232 is configured to travel along the automated order sortation system 200 and to autonomously transport singular items from the induction system 210 to the appropriate/assigned receptacle located in one of the positions of either the first matrix of receptacle stations 220 or the second matrix of receptacle stations 240. The item transport vehicles 232 are configured to autonomously transfer the item being carried into the appropriate/assigned receptacle. In some embodiments, after an item transport vehicle 232 has transferred into a receptacle the item it was carrying, then the item transport vehicle 232 will travel back to the induction system 210 along the lowest level of the item transportation system 230. Accordingly, it can be said that there is a high level of traffic along the lowest level of the item transportation system 230 and at levels near thereto.

Workers 10 and 20 attend to the first matrix of receptacle stations 220 and the second matrix of receptacle stations 240 respectively. The substantial length of the matrix of receptacle stations 220 and 240 can require the workers 10 and 20 to walk long distances (e.g., from end to end of the matrix of receptacle stations 220 and 240) while tending to the order sortation system 200. The time the workers 10 and 20 spend walking is generally unproductive time. Accordingly, as described further below, this disclosure describes a method of operating the order sortation system 200 that reduces the time the workers 10 and 20 spend walking while attending to the order sortation system 200.

Figure 4:
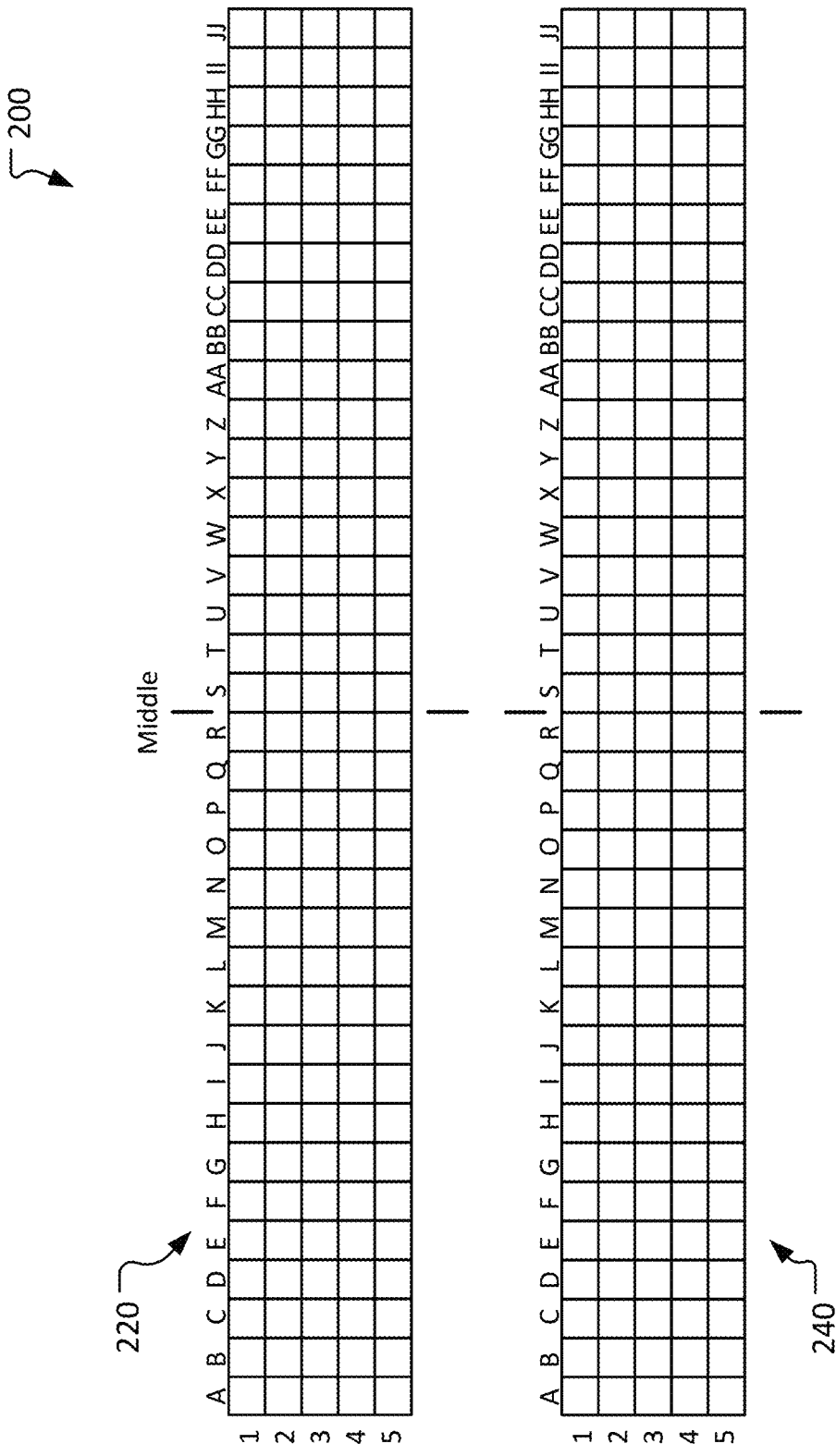
FIG. 4 is a schematic illustration of the order sortation system of FIG. 2.

FIG. 4 is a schematic depiction of the first matrix of receptacle stations 220 and the second matrix of receptacle stations 240. In this example, each of the first matrix of receptacle stations 220 and the second matrix of receptacle stations 240 includes 36 columns (A through JJ) and 5 rows (1 through 5) of receptacle stations. However, it should be understood that the inventive concepts described herein apply to any practical size or capacity (in terms of numbers and/or arrangements of receptacle stations) in the first matrix of receptacle stations 220 and the second matrix of receptacle stations 240.

While not specifically shown in this schematic depiction, the induction system 210 is located at an end of the first matrix of receptacle stations 220 and the second matrix of receptacle stations 240. In this example, the induction system 210 is located at the left end of the first matrix of receptacle stations 220 and the second matrix of receptacle stations 240 (i.e., near column A). In some embodiments, the induction system 210 may replace a column of receptacle stations. For example, in some embodiments the induction system 210 replaces (eliminates) column A of the first matrix of receptacle stations 220.

The first matrix of receptacle stations 220 and the second matrix of receptacle stations 240 can be divided into sections or portions for the purpose of establishing a scheme or pattern of utilizing the first matrix of receptacle stations 220 and the second matrix of receptacle stations 240 as described further below. For example, the middles of the first matrix of receptacle stations 220 and the second matrix of receptacle stations 240 are located between columns R and S. The first end portions of the first matrix of receptacle stations 220 and the second matrix of receptacle stations 240 are rows 1-4 of columns A-R. The second end portions of the first matrix of receptacle stations 220 and the second matrix of receptacle stations 240 are rows 1-4 of columns S-JJ.

In some embodiments, while the order sortation system 200 is less than fully utilized, an advantageous pattern of utilizing the order sortation system 200 prioritizes the utilization of the aforementioned portions of the first matrix of receptacle stations 220 and the second matrix of receptacle stations 240 in the following exemplary manner. The first priority for utilizing the order sortation system 200 is to utilize the first end portion of the first matrix of receptacle stations 220 (i.e., rows 1-4 of columns A-R of the first matrix of receptacle stations 220) and to utilize the second end portion of the second matrix of receptacle stations 240 (i.e., rows 1-4 of columns S-JJ of the second matrix of receptacle stations 240). Such a pattern of utilizing the less than fully utilized order sortation system 200 is advantageous for at least the following reasons.

First, by focusing the utilization of the matrices of receptacle stations 220 and 240 to one half of each of the matrices of receptacle stations 220 and 240, the workers 10 and 20 (FIG. 3) will not have to walk as far as if the entire length of the matrices of receptacle stations 220 and 240 is utilized. Accordingly, time spent walking is reduced, and productivity is increased.

Second, as described above in reference to FIG. 3, the item transport vehicles 232 travel along the order sortation system 200 between the matrices of receptacle stations 220 and 240. The item transport vehicles 232 deliver items to each side of the order sortation system 200 (i.e., to each of the matrices of receptacle stations 220 and 240). Accordingly, it is advantageous to utilize opposite end portions of the matrices of receptacle stations 220 and 240 so as to reduce the potential for traffic congestion of the item transport vehicles 232. In other words, utilizing the first end portion of the first matrix of receptacle stations 220 (i.e., rows 1-4 of columns A-R of the first matrix of receptacle stations 220) and the second end portion of the second matrix of receptacle stations 240 (i.e., rows 1-4 of columns S-JJ of the second matrix of receptacle stations 240) distributes the traffic of the item transport vehicles 232 evenly along the entire length of the order sortation system 200, and thereby reduces the potential for delays incurred from traffic congestion of the item transport vehicles 232.

Third, as described above, in some embodiments the item transport vehicles 232 return to the induction system 210 along, or near to, the lowest row of the matrices of receptacle stations 220 and 240 (e.g., along row 5). By not utilizing row 5 until necessary, the potential for delays incurred from traffic congestion of the item transport vehicles 232 is reduced.

Assuming that only the first end portion of the first matrix of receptacle stations 220 (i.e., rows 1-4 of columns A-R of the first matrix of receptacle stations 220) and the second end portion of the second matrix of receptacle stations 240 (i.e., rows 1-4 of columns S-JJ of the second matrix of receptacle stations 240) are being utilized, in some embodiments those portions can be utilized in the following manner. In some embodiments, the pattern of utilizing the first end portion of the first matrix of receptacle stations 220 and the second end portion of the second matrix of receptacle stations 240 can include alternating between the portions. In other words, in some embodiments pattern for utilizing the receptacle stations can be performed accordingly to the following sequence or priority: 1) a first receptacle of the first end portion of the first matrix of receptacle stations 220, 2) a first receptacle of the second end portion of the second matrix of receptacle stations 240, 3) a second receptacle of the first end portion of the first matrix of receptacle stations 220, 4) a second receptacle of the second end portion of the second matrix of receptacle stations 240, 5) a third receptacle of the first end portion of the first matrix of receptacle stations 220, 6) a third receptacle of the second end portion of the second matrix of receptacle stations 240, and so on, until all of the receptacles off the first end portion of the first matrix of receptacle stations 220 (i.e., rows 1-4 of columns A-R of the first matrix of receptacle stations 220) and the second end portion of the second matrix of receptacle stations 240 (i.e., rows 1-4 of columns S-JJ of the second matrix of receptacle stations 240) are being utilized. During such a process of utilizing the receptacle stations in the prioritized manner as described, if a previously utilized receptacle station becomes emptied by a worker (e.g., workers 10 or 20), then that receptacle station can become utilized again with an appropriately high priority in comparison to other non-utilized receptacle stations.

While, as described above, one pattern for utilizing the first end portion of the first matrix of receptacle stations 220 and the second end portion of the second matrix of receptacle stations 240 can be by simply randomly utilizing the receptacle stations in those portions, in some embodiments a more sophisticated scheme or pattern of prioritization can be used. For example, in some embodiments the pattern for utilizing the first end portion of the first matrix of receptacle stations 220 and the second end portion of the second matrix of receptacle stations 240 can be performed by starting near the middles and progressing outward. In other words, in some embodiments first the column R of the receptacle stations 220 and the column S of the receptacle stations 240 can be prioritized for utilization. After those are utilized, then column Q of the receptacle stations 220 and column T of the receptacle stations 240 can be prioritized for utilization. After those are utilized, then column P of the receptacle stations 220 and column U of the receptacle stations 240 can be prioritized for utilization. This pattern of prioritization can be followed until all of the first end portion of the first matrix of receptacle stations 220 and the second end portion of the second matrix of receptacle stations 240 are utilized.

Even further, in some embodiments the pattern for utilizing the first end portion of the first matrix of receptacle stations 220 and the second end portion of the second matrix of receptacle stations 240 can be more sophisticated (e.g., more granular) than simply in accordance with column scheme described above. That is, a column and row prioritization scheme or pattern can be used. For example, in some embodiments the priority for utilization of a column would be highest for the top row, and progressively lower in the lower rows. Accordingly, one example pattern of utilizing the first end portion of the first matrix of receptacle stations 220 and the second end portion of the second matrix of receptacle stations 240 can be in the sequence/priority as follows: 1) the receptacle station R1 of the receptacle stations 220, 2) the receptacle station S1 of the receptacle stations 240, 3) the receptacle station R2 of the receptacle stations 220, 4) the receptacle station S2 of the receptacle stations 240, 5) the receptacle station R3 of the receptacle stations 220, 6) the receptacle station S3 of the receptacle stations 240, 7) the receptacle station R4 of the receptacle stations 220, 8) the receptacle station S4 of the receptacle stations 240, 9) the receptacle station Q1 of the receptacle stations 220, 10) the receptacle station T1 of the receptacle stations 240, 11) the receptacle station Q2 of the receptacle stations 220, 12) the receptacle station T2 of the receptacle stations 240, and so on.

When the first end portion of the first matrix of receptacle stations 220 and the second end portion of the second matrix of receptacle stations 240 are fully utilized, in some embodiments the next or second tier of priority for utilization can be the second end portion of the first matrix of receptacle stations 220 (i.e., rows 1-4 of columns S-JJ of the first matrix of receptacle stations 220) and the first end portion of the second matrix of receptacle stations 240 (i.e., rows 1-4 of columns A-R of the second matrix of receptacle stations 240). In such a case then, all receptacle stations of the matrices of receptacle stations 220 and 240 would be candidates for utilization except for the lowest row (e.g., row 5) of each of the matrices of receptacle stations 220 and 240. Utilization of the second end portion of the first matrix of receptacle stations 220 and the first end portion of the second matrix of receptacle stations 240 can be analogously prioritized in accordance with any of the patterns or schemes described above in reference to the first end portion of the first matrix of receptacle stations 220 and the second end portion of the second matrix of receptacle stations 240.

When the first and second end portions of the first matrix of receptacle stations 220 and the first and second end portions of the second matrix of receptacle stations 240 are fully utilized, in some embodiments the next or third tier of priority for utilization can be the lowest row (e.g., row 5) of each of the matrices of receptacle stations 220 and 240. Further, in some embodiments the utilization of the lowest row (e.g., row 5) of each of the matrices of receptacle stations 220 and 240 can be prioritized starting with the column JJ, then column II, then column HH, and so on towards the other end of the matrices of receptacle stations 220 and 240. In other words, in some embodiments the pattern for utilizing the lowest row of each of the first and second matrices of receptacle stations 220 and 240 starts at an end of the second end portion of the first matrix 220 and at an end of the second end portion of the second matrix 240, and progresses toward an end of the first end portion of the first matrix 220 and an end of the first end portion of the second matrix 240, respectively. In some embodiments, the priority can also be to alternate between the matrices of receptacle stations 220 and 240 along the row 5.

Figure 5:
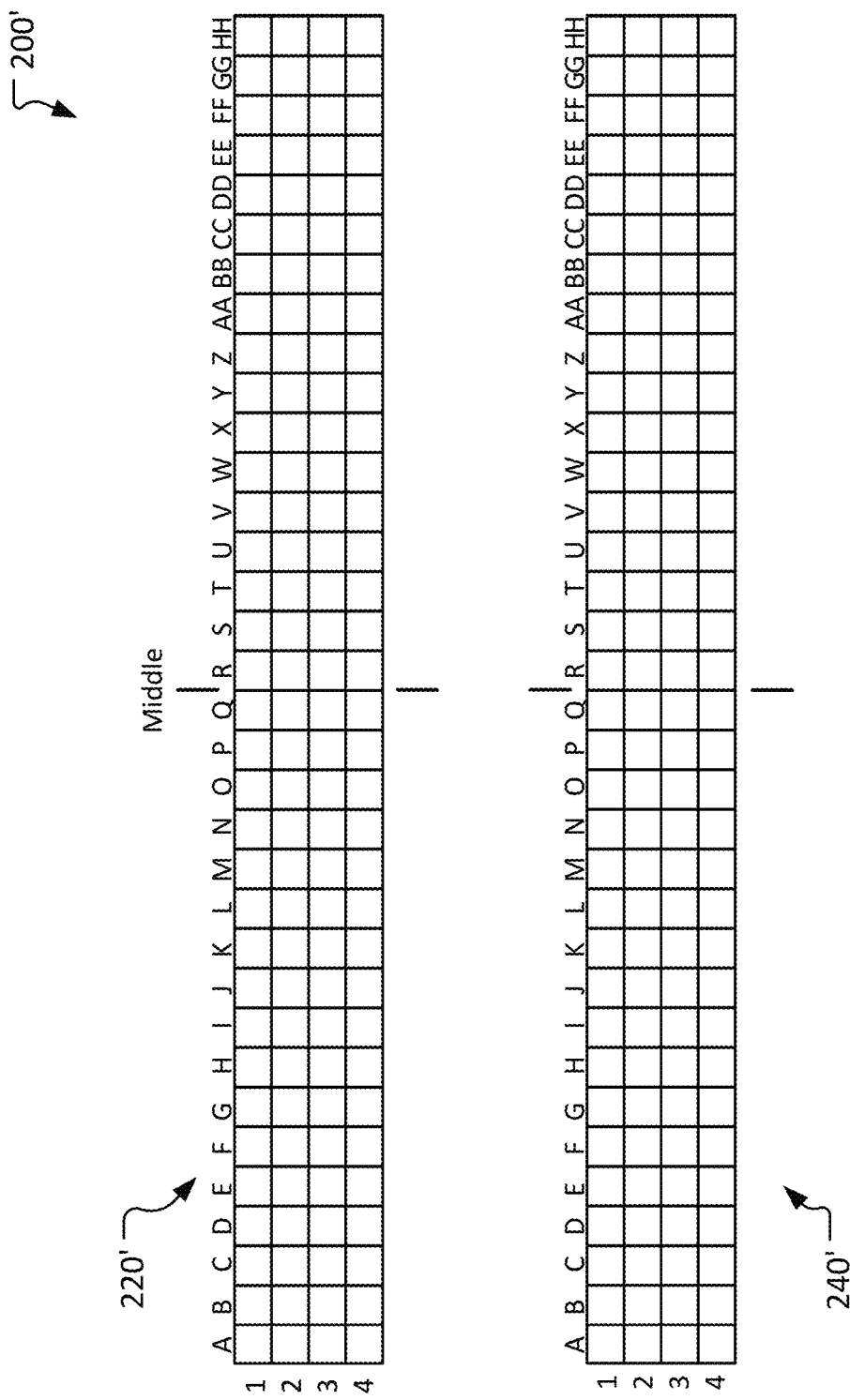
FIG. 5 is a schematic illustration of another example order sortation system.

FIG. 5 is a schematic depiction of a variation of the example order sortation system 200 (denoted here, accordingly, as order sortation system 200' to distinguish that the structure is similar to the order sortation system 200 except for the differences described below). Similar to the order sortation system 200 (FIGS. 2-4), the order sortation system 200' includes a first matrix of receptacle stations 220' and a second matrix of receptacle stations 240' arranged back to back with a plurality of multi-directional item transport vehicles 232 operating therebetween.

In the depicted example, each of the first matrix of receptacle stations 220' and the second matrix of receptacle stations 240' includes 34 columns (A through HH, which is in contrast to the 36 columns of the order sortation system 200) and 4 rows (1 through 4, which is in contrast to the 5 rows of receptacle stations of the order sortation system 200) of receptacle stations. Accordingly, it should be understood that the inventive concepts described herein apply to any practical size or capacity (in terms of numbers and/or arrangements of receptacle stations) in the first matrix of receptacle stations 220' and the second matrix of receptacle stations 240'.

While not specifically shown in this schematic depiction, the induction system 210 (FIGS. 2 and 3) is located at an end of the first matrix of receptacle stations 220' and the second matrix of receptacle stations 240'. In this example, the induction system 210 is located at the left end of the first matrix of receptacle stations 220' and the second matrix of receptacle stations 240' (i.e., near column A). In some embodiments, the induction system 210 may replace a column of receptacle stations. For example, in some embodiments the induction system 210 replaces (eliminates) column A of the first matrix of receptacle stations 220'.

The first matrix of receptacle stations 220' and the second matrix of receptacle stations 240' can be divided into sections or portions for the purpose of establishing a scheme or pattern of utilizing the first matrix of receptacle stations 220' and the second matrix of receptacle stations 240' as described further below. In the example described below, the pattern of utilizing the first matrix of receptacle stations 220' and the second matrix of receptacle stations 240' takes into account the ergonomics pertaining to the physical work (e.g., lifting, reaching, etc.) required to tend to the order sortation system 200'. That is, the pattern of utilizing the order sortation system 200' tends to reduce the frequency of required physical motions of workers that are not as ergonomic as other physical motions. For example, the upper row 1 is not utilized until after the middle rows 2 and 3 are fully utilized. In that manner, the workers tending to the order sortation system 200' will be less likely to be required to reach upward to the highest row 1. This is ergonomically advantageous because handling weighty articles while reaching upward can be physically strenuous for a worker. It is generally ergonomically better for a worker to handle weighty articles nearer to the core of the worker's body (which is where rows 2 and 3 are located).

At a high level (and as introduced above), the order sortation system 200' can be operated in accordance with an ergonomically-based scheme or pattern of utilizing the first matrix of receptacle stations 220' and the second matrix of receptacle stations 240' that includes full utilization of rows 2 and 3 before row 1 becomes utilized at all. After that (i.e., when rows 1, 2, and 3 are all fully utilized), then row 4 will lastly start to become utilized.

In addition, a throughput-based scheme for utilizing the first matrix of receptacle stations 220' and the second matrix of receptacle stations 240' can also be combined with the ergonomically-based scheme. Specifically, within the high-level pattern of using rows 2 and 3 before rows 1 and 4, rows 2 and 3 can be divided into prioritized portions and utilized in accordance with a particular scheme or pattern directed to enhancing throughput. For example, in some embodiments rows 2 and 3 of the first matrix of receptacle stations 220' and rows 2 and 3 of the second matrix of receptacle stations 240' can each be divided into first priority portions, second priority portions, third priority portions, and fourth priority portions. The second priority portions are not utilized unless and until the first priority portions are fully utilized. The third priority portions are not utilized unless and until the first and second priority portions are fully utilized. The fourth priority portions are not utilized unless and until the first, second, and third priority portions are fully utilized.

In one such example, columns I-Q of rows 2 and 3 of the first matrix of receptacle stations 220' are deemed to be a first priority portion. In addition, columns R-Z of rows 2 and 3 of the second matrix of receptacle stations 240' are deemed to be a first priority portion. It can be noticed that these two first priority portions are near to the middles of the first matrix of receptacle stations 220' and the second matrix of receptacle stations 240', and are on opposite sides of the middles (i.e., the middles are located between columns Q and R). Accordingly, the walking distances of the workers 10 and 20 (FIG. 3) are kept to a minimum and the potential for delays incurred from traffic congestion of the item transport vehicles 232 is reduced.

When the two first priority portions of the first matrix of receptacle stations 220' and the second matrix of receptacle stations 240' are fully utilized, then the second priority portions (i.e., columns R-Z of rows 2 and 3 of the first matrix of receptacle stations 220' and columns I-Q of the second matrix of receptacle stations 240') start to become utilized.

When the two first priority portions and the two second priority portions of the first matrix of receptacle stations 220' and the second matrix of receptacle stations 240' are fully utilized, then the third priority portions (i.e., columns A-H of rows 2 and 3 of the first matrix of receptacle stations 220' and columns AA-HH of the second matrix of receptacle stations 240') start to become utilized.

When the two first priority portions, the two second priority portions, and the two third priority portions of the first matrix of receptacle stations 220' and the second matrix of receptacle stations 240' are fully utilized, then the fourth priority portions (i.e., columns AA-HH of rows 2 and 3 of the first matrix of receptacle stations 220' and columns A-H of the second matrix of receptacle stations 240') start to become utilized. As receptacle stations open up (e.g., when workers 10/20 remove a bin containing items from a receptacle station and put an empty bin in the receptacle station) the highest priority open receptacle will be utilized first.

Finally, when all of rows 2 and 3 of the first matrix of receptacle stations 220' and the second matrix of receptacle stations 240' are fully utilized (e.g., in accordance with the prioritized portions described above), then row 1 of the first matrix of receptacle stations 220' and the second matrix of receptacle stations 240' can start to be utilized. Further, when all of row 1 of the first matrix of receptacle stations 220' and the second matrix of receptacle stations 240' is fully utilized, then row 4 of the first matrix of receptacle stations 220' and the second matrix of receptacle stations 240' can start to be utilized. By keeping bottom row 4 open as long as possible, the potential for delays incurred from traffic congestion of the item transport vehicles 232 (FIG. 3) is reduced because, in some embodiments, the item transport vehicles 232 return to the induction system 210 along, or near to, the lowest row of the matrices of receptacle stations 220' and 240' (e.g., along row 4).

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, a trackball, or a touchscreen, etc.) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, tactile input, eye movement tracking input, a brain-computer interface, gesture input, and the like, and combinations thereof).

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

What is claimed is:

1. A method of automatic order sortation, the method comprising:
   receiving, by an automated order sortation system, a plurality of items individually inducted into the automated order sortation system, the automated order sortation system comprising:
      a plurality of receptacle stations arranged in a first matrix and a second matrix, wherein the first and second matrices of receptacle stations are arranged parallel to each other and are separated by an item transportation system,
      the first matrix of receptacle stations comprising: (i) a first end portion, (ii) a second end portion, and a (iii) middle located between the first and second end portions,
      the second matrix of receptacle stations comprising: (i) a first end portion, (ii) a second end portion, and a (iii) middle located between the first and second end portions,
      wherein each of: (a) the first end portions, (b) the middles, and (c) the second end portions of the first and second matrices of receptacle stations are aligned with each other on opposite sides of the item transportation system; and
      the item transportation system comprising multiple item transport vehicles configured to travel along the automated order sortation system between the first and second matrices of receptacle stations, each of the item transport vehicles configured to transport singular items of the plurality of items and to transfer the singular items to individual receptacle stations of the plurality of receptacle stations; and
   transporting, by the item transport vehicles, the plurality of items to the plurality of receptacle stations so as to utilize the plurality of receptacle stations in accordance with a pattern comprising alternating between: (i) the first end portion of the first matrix and (ii) the second end portion of the second matrix, while a lowest row and a highest row of each of the first and second matrices of receptacle stations is unutilized.

2. The method of claim 1, wherein the pattern further comprises utilizing the first end portion of the first matrix and the second end portion of the second matrix by starting near the middles and progressing outward.

3. The method of claim 1, comprising continuing the alternating between: (i) the first end portion of the first matrix and (ii) the second end portion of the second matrix until both of the first end portion of the first matrix and the second end portion of the second matrix are fully utilized.

4. The method of claim 3, wherein the pattern further comprises, after both of the first end portion of the first matrix and the second end portion of the second matrix are fully utilized, alternating between: (iii) the second end portion of the first matrix and (iv) the first end portion of the second matrix, while the lowest row and the highest row of each of the first and second matrices of receptacle stations is unutilized.

5. The method of claim 4, wherein the pattern further comprises utilizing the second end portion of the first matrix and the first end portion of the second matrix by starting near the middles and progressing outward.

6. The method of claim 4, wherein the pattern further comprises, after both of the first and second end portions of the first matrix and both of the first and second end portions of the second matrix are all fully utilized, beginning to utilize the highest row of each of the first and second matrices of receptacle stations while the lowest row of each of the first and second matrices of receptacle stations is unutilized.

7. The method of claim 6, wherein the pattern further comprises after: (i) both of the first and second end portions of the first matrix are fully utilized, (ii) both of the first and second end portions of the second matrix are fully utilized, and (iii) the highest rows of the first and second matrices of receptacle stations are fully utilized, beginning to utilize the lowest rows of the first and second matrices of receptacle stations.

8. The method of claim 1, wherein the plurality of items individually inducted into the automated order sortation system induction line are inducted on an induction conveyor located at an end of the first end portion of the first matrix.

9. The method of claim 8, further comprising determining, by the automated order sortation system, an identity of each item of the plurality of items individually inducted into the automated order sortation system.

10. An automatic order sortation system, comprising:
    a plurality of receptacle stations arranged in a first matrix and a second matrix, wherein the first and second matrices of receptacle stations are arranged parallel to each other and are separated by an item transportation system,
       the first matrix of receptacle stations comprising: (i) a first end portion, (ii) a second end portion, and a (iii) middle located between the first and second end portions,
       the second matrix of receptacle stations comprising: (i) a first end portion, (ii) a second end portion, and a (iii) middle located between the first and second end portions,
       wherein each of: (a) the first end portions, (b) the middles, and (c) the second end portions of the first and second matrices of receptacle stations are aligned with each other on opposite sides of the item transportation system; and
    the item transportation system comprising multiple item transport vehicles configured to travel along the automated order sortation system between the first and second matrices of receptacle stations, each of the item transport vehicles configured to transport singular items of the plurality of items and to transfer the singular items to individual receptacle stations of the plurality of receptacle stations; and
    a control system configured to control the item transportation system to utilize the plurality of receptacle stations in accordance with a pattern comprising alternating between: (i) the first end portion of the first matrix and (ii) the second end portion of the second matrix, while a lowest row of each of the first and second matrices of receptacle stations is unutilized.

11. The system of claim 10, further comprising an induction conveyor located at an end of the first end portion of the first matrix.

12. The system of claim 11, further comprising a bar code scanner configured to determine an identity of each item of the plurality of items individually inducted into the automated order sortation system via the induction conveyor.

13. The system of claim 10, wherein the pattern further comprises utilizing the first end portion of the first matrix and the second end portion of the second matrix by starting near the middles and progressing outward.

14. The system of claim 10, wherein the pattern further comprises, after both of the first end portion of the first matrix and the second end portion of the second matrix are fully utilized, alternating between: (iii) the second end portion of the first matrix and (iv) the first end portion of the second matrix, while the lowest row of each of the first and second matrices of receptacle stations is unutilized.

15. The system of claim 14, wherein the pattern further comprises utilizing the second end portion of the first matrix and the first end portion of the second matrix by starting near the middles and progressing outward.

16. The system of claim 14, wherein the pattern further comprises, after both of the first and second end portions of the first matrix and both of the first and second end portions of the second matrix are fully utilized, beginning to utilize the lowest row of each of the first and second matrices of receptacle stations.

17. The system of claim 16, wherein the utilizing the lowest row of each of the first and second matrices of receptacle stations starts at an end of the second end portion of the first matrix and at an end of the second end portion of the second matrix, and progresses toward an end of the first end portion of the first matrix and an end of the first end portion of the second matrix, respectively.

18. The system of claim 10, further comprising a plurality of bins, each bin of the plurality of bins positioned in a receptacle station of the plurality of receptacle stations.

19. The system of claim 10, wherein the pattern further comprises utilizing the second end portion of the first matrix and the first end portion of the second matrix by starting near the middles and progressing outward, and wherein the pattern further comprises starting at a top of each column and progressing downward until the column is utilized.

20. The system of claim 10, wherein the item transport vehicles are configured to travel along between the lowest row of the first and second matrices of receptacle stations after transferring the singular items to the individual receptacle stations of the plurality of receptacle stations.

* * * * *